US010223041B2

United States Patent
Inoue

(10) Patent No.: US 10,223,041 B2
(45) Date of Patent: Mar. 5, 2019

(54) PRINTING APPARATUS HAVING WIRELESS DIRECT COMMUNICATION FUNCTION AND METHOD OF CONTROLLING THE PRINTING APPARATUS

(71) Applicant: CANON KABUSHIKI KAISHA, Tokyo (JP)

(72) Inventor: Go Inoue, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/340,220

(22) Filed: Nov. 1, 2016

(65) Prior Publication Data

US 2017/0131953 A1    May 11, 2017

(30) Foreign Application Priority Data

Nov. 6, 2015    (JP) ................. 2015-218407

(51) Int. Cl.
*G06F 3/12*    (2006.01)
*H04N 1/00*    (2006.01)

(52) U.S. Cl.
CPC .......... *G06F 3/1204* (2013.01); *G06F 3/1267* (2013.01); *G06F 3/1268* (2013.01);
(Continued)

(58) Field of Classification Search
CPC . G06F 3/1222; G06F 3/1204; H04N 1/00315; H04N 1/00204
(Continued)

(56) References Cited

U.S. PATENT DOCUMENTS 8,976,391 B2    3/2015 Nanaumi
2012/0262742 A1*  10/2012 Yano .................. H04N 1/46
                                                          358/1.9
(Continued)

FOREIGN PATENT DOCUMENTS

JP    2004181763 A    7/2004
JP    2013205982 A    10/2013
(Continued)

OTHER PUBLICATIONS

Extended European Search Report issued in European Patent Application No. 16002326.3 dated Mar. 29, 2017.
(Continued)

*Primary Examiner* — Neil R McLean
(74) *Attorney, Agent, or Firm* — Rossi, Kimms & McDowell LLP

(57) ABSTRACT

A printing apparatus capable of improving user-friendliness when the user inputs a print job via wireless direct communication in a case where a setting of reservation printing is active. The printing apparatus has a wireless direct communication function and a reservation function for reserving a received print job. A setting unit sets whether or not to use the reservation function. A determination unit determines whether or not the print job received by the printing apparatus is a print job received by the wireless direct communication function. A control unit prints the received print job without reservation according to determination by the determination unit that the received print job is a print job received by the wireless direct communication function, even in a case where use of the reservation function has been set by the setting unit.

16 Claims, 9 Drawing Sheets

(52) U.S. Cl.
CPC ....... *G06F 3/1292* (2013.01); *H04N 1/00204* (2013.01); *H04N 1/00315* (2013.01); *H04N 2201/0039* (2013.01); *H04N 2201/0041* (2013.01); *H04N 2201/0094* (2013.01)

(58) Field of Classification Search
USPC ............................................... 358/1.14, 1.15
See application file for complete search history.

(56) References Cited

U.S. PATENT DOCUMENTS

| | | | |
|---|---|---|---|
| 2013/0148149 A1* | 6/2013 | Park | G06F 3/1296 358/1.13 |
| 2013/0258399 A1* | 10/2013 | Nanaumi | G06K 15/405 358/1.15 |
| 2015/0153986 A1 | 6/2015 | Lin et al. | |
| 2015/0156341 A1* | 6/2015 | Sugita | H04N 1/0048 358/1.15 |
| 2016/0352946 A1* | 12/2016 | Eguchi | H04N 1/00307 |

FOREIGN PATENT DOCUMENTS

| | | |
|---|---|---|
| JP | 2014168212 A | 9/2014 |
| JP | 2015107594 A | 6/2015 |

OTHER PUBLICATIONS

Office Action issued in Japanese Appln. No. 2015-218407 dated Sep. 5, 2017.

\* cited by examiner

Ether Header Destination  00:00:85:23:12:ac
   Ether Header Source       85:12:ac:23:de:23
   IP Header Destination     192.168.22.1
   IP Header Source          192.168.22.2
   TCP Port Destination      9100
   TCP Port Source           31000
   Packet Body Section
      Job Name               Data-01.doc
      Job Owner              Alice
      Job Specific Data      Through Print
      Job Data               xxxxxxxxxxxxxxxxxxxx
```

PRINTING APPARATUS HAVING WIRELESS DIRECT COMMUNICATION FUNCTION AND METHOD OF CONTROLLING THE PRINTING APPARATUS

BACKGROUND OF THE INVENTION

Field of the Invention

The present invention relates to a printing apparatus having a wireless direct communication function and a method of controlling the printing apparatus.

Description of the Related Art

As a printing apparatus, such as a multifunction peripheral (MFP) or a printer, there has been widely used one which has a wireless LAN function. The printing apparatus equipped with the wireless LAN function receives print data via an access point from an external apparatus, such as a PC or a mobile terminal, and performs print processing based on the received print data.

Further, some printing apparatuses have a function of wireless direct communication, such as Wi-Fi direct communication, for directly performing wireless LAN communication with an external apparatus without via a relay device, such as an access point, (hereinafter referred to as "performing wireless direct communication"). In Japanese Patent Laid-Open Publication No. 2013-205982, a printing apparatus has been disclosed which performs communication with a mobile terminal by the function of wireless direct communication.

In the printing apparatus disclosed in Japanese Patent Laid-Open Publication No. 2013-205982, to perform wireless direct communication, first, a user selects a start button or the like for Wi-Fi direct communication from a console section of the printing apparatus, and starts Wi-Fi direct communication. Next, the user selects a connection button from a console section of the mobile terminal to thereby transmit a connection request from the mobile terminal to the printing apparatus. At a time point when the printing apparatus responds to the connection request, wireless direct communication is established.

On the other hand, there are many printing apparatuses, such as one disclosed in Japanese Patent Laid-Open Publication No. 2004-181763, which are equipped with a function, called a function of reservation printing, for storing a received print job in a storage area of the printing apparatus without performing pint processing until a user instruction to perform the print processing is given. In the case of such reservation printing, the user is required to go over to the printing apparatus, select the user's reserved print job from a console section of the printing apparatus, and give an instruction to perform print processing of the print job. The function of reservation printing aims to prevent the user from forgetting to take the printed matter formed based on the print job, and allows the print job to be subjected to print processing only in a case where it is assured that the user is in front of the printing apparatus.

However, there is a case where the printing apparatus has an activated setting of reservation printing, and also the user inputs a print job via wireless direct communication, such as Wi-Fi direct communication. In this case, it is assumed that the user is in front of the printing apparatus in order to start wireless direct communication. Therefore, although it is assured that the user is in front of the printing apparatus, the print job input via wireless direct communication is reserved in the printing apparatus, and the user has to take the trouble to perform an operation for causing the printing apparatus to start print processing by searching for the user's print job on the console section, which leads to degraded user-friendliness and an increased operation load on the user.

SUMMARY OF THE INVENTION

The present invention provides a printing apparatus which is capable of improving user-friendliness when the user inputs a print job via wireless direct communication in a case where a setting of reservation printing is active, and a method of controlling the printing apparatus.

In a first aspect of the present invention, there is provided a printing apparatus having a wireless direct communication function and a reservation function for reserving a received print job, comprising a setting unit configured to set whether or not to use the reservation function, a determination unit configured to determine whether or not the print job received by the printing apparatus is a print job received by the wireless direct communication function, and a control unit configured to print the received print job without reserving the received print job according to determination by the determination unit that the received print job is a print job received by the wireless direct communication function, even in a case where use of the reservation function has been set by the setting unit.

In a second aspect of the present invention, there is provided a printing apparatus having a wireless direct communication function and a reservation function for reserving a received print job, comprising a first determination unit configured to, when the printing apparatus receives a print job, determine whether or not to reserve the received print job by the reservation function, and a control unit configured to reserve the received print job in a storage unit according to determination by the first determination unit that the received print job is to be reserved, and print the received print job without reserving the received print job according to determination by the first determination unit that the received print job is not to be reserved, and wherein in a case where the received print job is a print job received by the wireless direct communication function, and also a setting indicating that no print job received by the wireless direct communication function is to be reserved has been made in the printing apparatus, the first determination unit determines that the received print job is not to be reserved.

In a third aspect of the present invention, there is provided a method of controlling a printing apparatus having a wireless direct communication function and a reservation function for reserving a received print job, comprising setting whether or not to use the reservation function, determining whether or not the print job received by the printing apparatus is a print job received by the wireless direct communication function, and printing the received print job without reserving the received print job according to determination that the received print job is a print job received by the wireless direct communication function, even in a case where use of the reservation function has been set.

In a fourth aspect of the present invention, there is provided a method of controlling a printing apparatus having a wireless direct communication function and a reservation function for reserving a received print job, comprising determining, when the printing apparatus receives a print job, whether or not to reserve the received print job by the reservation function, and reserving the received print job in a storage unit according to determination that the received print job is to be reserved, and printing the received print job without reserving the received print job according to determination that the received print job is not to be reserved, and wherein in a case where the received print job is a print job received by the wireless direct communication function, and also a setting indicating that no print job received by the wireless direct communication function is to be reserved has been made in the printing apparatus, it is determined that the received print job is not to be reserved.

According to the present invention, it is possible to improve user-friendliness when a user inputs a print job via wireless direct communication in the case where the reservation setting is active.

Further features of the present invention will become apparent from the following description of exemplary embodiments (with reference to the attached drawings).

BRIEF DESCRIPTION OF THE DRAWINGS

FIGS. 7A to 7C are diagrams illustrating screens displayed on the console section of the printing apparatus, for starting and stopping wireless direct communication, in which FIG. 7A illustrates a screen for starting wireless direct communication, and FIGS. 7B and 7C illustrate screens for stopping wireless direct communication.

FIG. 13 is a diagram illustrating packet data of a print job which a mobile terminal inputs to a printing apparatus according to the third embodiment.

DESCRIPTION OF THE EMBODIMENTS

The present invention will now be described in detail below with reference to the accompanying drawings showing embodiments thereof. The invention according to claims is not limited to the following embodiments, and further, a combination all features described in each of embodiments are not necessarily required for solution of the invention.

Figure 1:
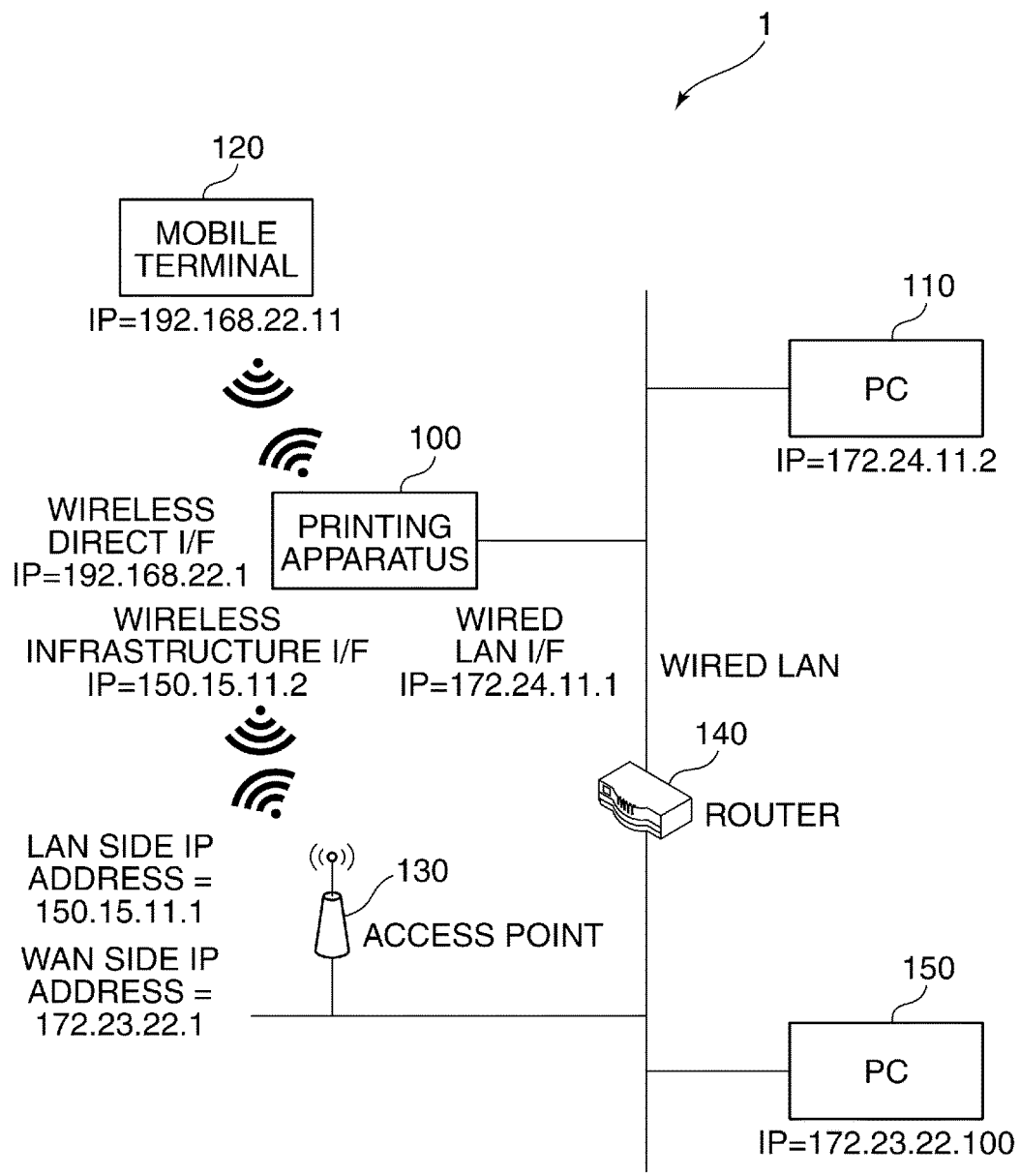
FIG. 1 is a schematic diagram of a network system including a printing apparatus according to a first embodiment of the present invention.

FIG. 1 is a schematic diagram of a network system 1 including a printing apparatus 100 according to a first embodiment of the present invention.

Referring to FIG. 1, the network system 1 includes a printing apparatus 100, PCs 110 and 150, a mobile terminal 120, an access point 130, and a router 140.

The printing apparatus 100 includes three network interfaces, and is equipped with a multi-homing function for simultaneously operating the network interfaces. The printing apparatus 100 is connected to the PC 110 by a wired LAN, and is connected to the PC 150 by the wired LAN via the router 140. The printing apparatus 100 uses an IP address 172.24.11.1 for a wired LAN interface for the wired LAN. Further, when the printing apparatus 100 performs wireless direct communication, such as Wi-Fi direct communication, with the mobile terminal 120, without via a relay device, such as an access point or a gateway, the printing apparatus 100 uses an IP address 192.168.22.1 for a wireless direct interface for wireless direct communication. At this time, the printing apparatus 100 operates as a server for wireless direct communication, to receive a connection request, and the mobile terminal 120 operates as a client to transmit the connection request to the printing apparatus 100, whereby wireless direct communication is established therebetween. Further, when the printing apparatus 100 performs wireless LAN communication with the PC 150 or the mobile terminal 120, via the access point 130, the printing apparatus 100 uses an IP address 150.15.11.2 for a wireless infrastructure interface for wireless LAN communication.

Note that although in the present embodiment, the printing apparatus 100 is configured to have three network interfaces, this is not limitative, but the printing apparatus 100 may be configured otherwise insofar as it is equipped with a multi-home function for simultaneously operating at least two network interfaces including the wireless direct interface and another network interface than the wireless direct interface.

Figure 2:
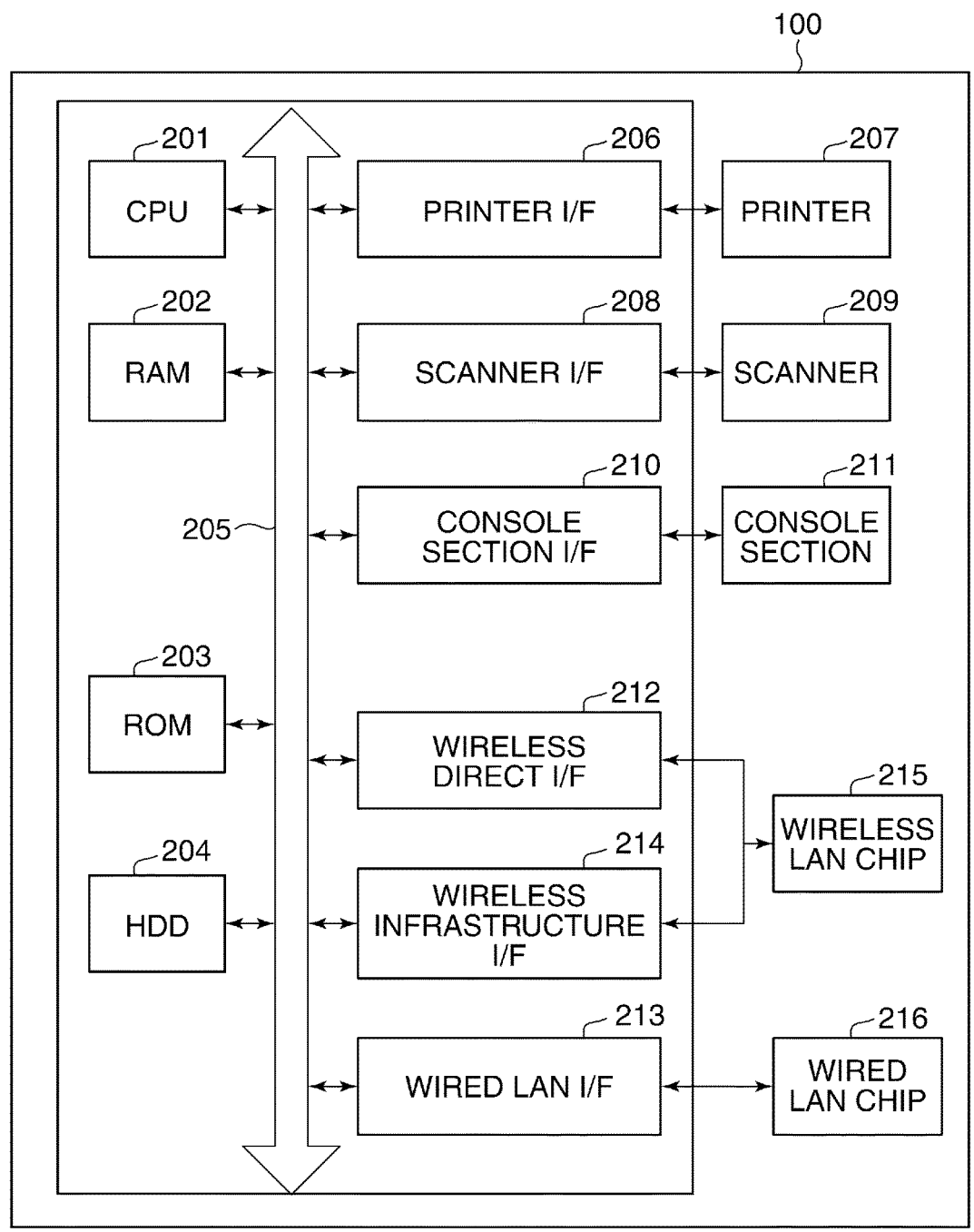
FIG. 2 is a block diagram showing a hardware configuration of the printing apparatus according to the first embodiment.

FIG. 2 is a block diagram showing a hardware configuration of the printing apparatus 100 according to the first embodiment. Note that although in the present embodiment, the printing apparatus 100 is a multifunction peripheral which has not only a printer function but also a scanner function, it may be a printer which does not have the scanner function.

The printing apparatus 100 includes a CPU 201, a RAM 202, a ROM 203, an HDD 204, a printer interface 206, a scanner interface 208, a console section interface 210, the wireless direct interface, denoted by reference numeral 212, the wired LAN interface 213, and the wireless infrastructure interface, denoted by reference numeral 214. These components of the printing apparatus 100 are connected to each other via a bus 205.

The RAM 202 is used as a main memory and a temporary storage area, such as a work area, for the CPU 201. The ROM 203 stores control programs, and the HDD 204 stores various data, such as print data and scan image data.

The printing apparatus 100 further includes a printer 207 (print processor) connected to the printer interface 206, a scanner 209 connected to the scanner interface 208, and a console section 211 connected to the console section interface 210.

Further, the printing apparatus 100 includes a wireless LAN chip 215 connected to the wireless direct interface 212 and the wireless infrastructure interface 214, and a wired LAN chip 216 connected to the wired LAN interface 213.

The CPU 201 reads control programs stored in the ROM 203, and performs various processes for controlling the operation of the printing apparatus 100. Note that it is assumed that in the case of the printing apparatus 100 according to the present embodiment, the single CPU 201 performs processes described hereinafter with reference to figures, but this is not limitative. For example, the processes may be performed by cooperation of a plurality of CPUs.

The printer 207 performs print processing on sheets based on print data received from an external apparatus or a scan image generated by the scanner 209, and discharges the sheets (hereinafter referred to as the "printing-and-discharging processing"). The scanner 209 reads an original and generates a scan image (read image data). The scan image generated by the scanner 209 is printed by the printer 207 or is stored in the HDD 204.

The console section 211 includes a liquid crystal display section having a touch panel function, and a keyboard, and displays various screens, referred to hereinafter. A user can input an instruction and information to the printing apparatus 100 via the console section 211.

The wireless LAN chip 215 realizes communication with an external apparatus by wireless LAN communication. Wireless LAN connection is classified into connection types including wireless infrastructure connection and direct wireless connection.

The wireless direct interface 212 performs wireless direct communication, such as Wi-Fi direct communication, via the wireless LAN chip 215, with an external apparatus, such as the mobile terminal 120.

The wireless infrastructure interface 214 performs wireless LAN communication, which is relayed by the access point 130, via the wireless LAN chip 215, with an external apparatus, such as the PC 150 or the mobile terminal 120.

The wired LAN interface 213 performs wired LAN communication, via the wired LAN chip 216, with an external apparatus, such as the PC 110 or 150.

Figure 3:
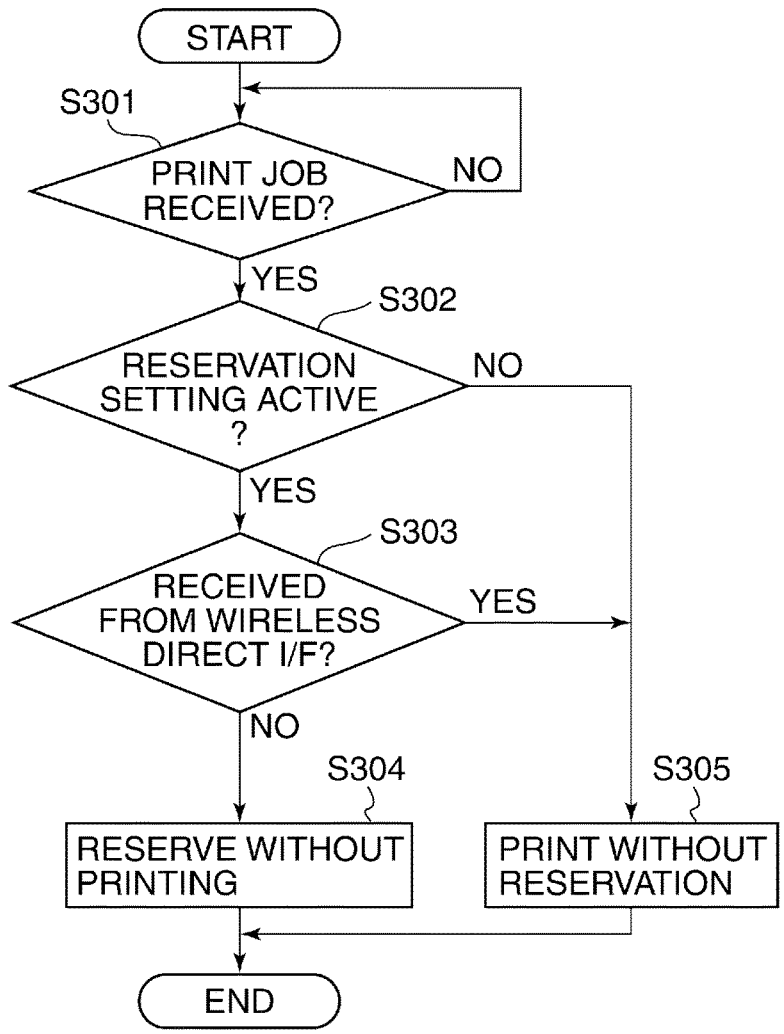
FIG. 3 is a flowchart of a process performed by the printing apparatus according to the first embodiment, for handling a print job received from outside.

FIG. 3 is a flowchart of a process performed by the printing apparatus according to the first embodiment, for handling a print job received from outside. Each step in the process shown in FIG. 3 is performed by the CPU 201 loading a control program stored in a memory, such as the ROM 203, into the RAM 202 and executing the program.

Figure 4:
FIG. 4 is a diagram illustrating a screen displayed on a console section when a reservation setting is made in the printing apparatus according to the first embodiment.

If the CPU 201 determines in a step S301 that a print job has been received from an external apparatus, the CPU 201 proceeds to a step S302. In the step S302, the CPU 201 determines whether or not a setting for causing the printing apparatus 100 to perform reservation processing (hereinafter referred to as the "reservation setting") is active. Here, the reservation processing refers to processing for causing print data of the received print job to be stored in the HDD 204 of the printing apparatus 100, without causing the print data to be printed on sheets or printed sheets to be discharged, until a user instruction for printing the print data is received via the console section 211. The determination as to whether or not the reservation setting is active is performed with reference to a setting of the reservation setting made in advance by operating the console section 211 on a screen 1301 shown in FIG. 4.

If the reservation setting is inactive (NO to the step S302), the CPU 201 proceeds to a step S305, wherein the CPU 201 causes the printer 207 to perform the printing-and-discharging processing instead of performing the reservation processing, followed by terminating the present process. If the reservation setting is active (YES to the step S302), the CPU 201 proceeds to a step S303. In the step S303, the CPU 201 determines whether or not the received print job is one received from the wireless direct interface 212 of the printing apparatus 100. If it is determined that the received print job is one received from a network interface other than the wireless direct interface 212 (NO to the step S303), the CPU 201 proceeds to a step S304. In the step S304, the CPU 201 performs the reservation processing according to the reservation setting activated in the printing apparatus 100, followed by terminating the present process. If it is determined that the received print job is one received from the wireless direct interface 212 (YES to the step S303), the CPU 201 proceeds to the step S305. In the step S305, the CPU 201 causes the printer 207 to perform the printing-and-discharging processing instead of performing the reservation processing, followed by terminating the present process.

As described above, in the printing apparatus 100, even in a case where the reservation setting is active, if the received print job is one received from the wireless direct interface 212, the CPU 201 causes the printer 207 to perform the printing-and-discharging processing instead of performing the reservation processing. Therefore, in a case where it is assured that the user is in front of the printing apparatus 100, no wasteful reservation processing is performed, whereby it is possible to realize reduction of operation load on the user and improvement of user-friendliness.

Figure 5:
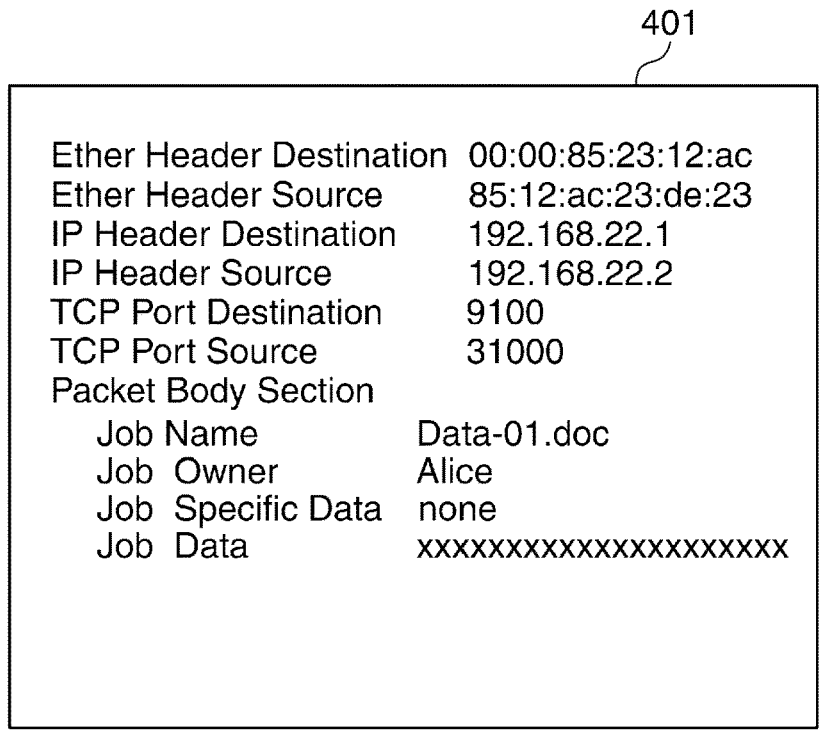
FIG. 5 is a diagram illustrating packet data of a print job that a mobile terminal inputs to the printing apparatus according to the first embodiment.

FIG. 5 is a diagram illustrating packet data 401 of a print job that the mobile terminal 120 inputs to the printing apparatus according to the first embodiment.

When the printing apparatus 100 receives the packet data 401 of the print job illustrated in FIG. 5, the CPU 201 performs the step S303 based on the received packet data. That is, the CPU 201 determines whether or not the print job is one received from the wireless direct interface 212. The CPU 201 performs this determination by performing one of several methods for determining which of the network interfaces has received the print job. For example, the determination is performed based on which of the wired LAN interface 213, the wireless infrastructure interface 214, and the wireless direct interface 212 of the printing apparatus 100 has a MAC address matching a MAC address of ether header destination. Alternatively, the determination is performed based on which of the wired LAN interface 213, the wireless infrastructure interface 214, and the wireless direct interface 212 of the printing apparatus 100 has an IP address matching an IP address of IP header destination. Further alternatively, the determination is performed based on whether or not an IP address of IP header source is an IP address assigned by the printing apparatus 100 serving as a DHCP server.

In the example illustrated in FIG. 5, the IP address of IP header destination matches the IP address of the wireless direct interface 212 of the printing apparatus 100. Therefore, the CPU 201 determines in the step S303 in FIG. 3 that the print job is one received from the wireless direct interface 212.

Figure 6:
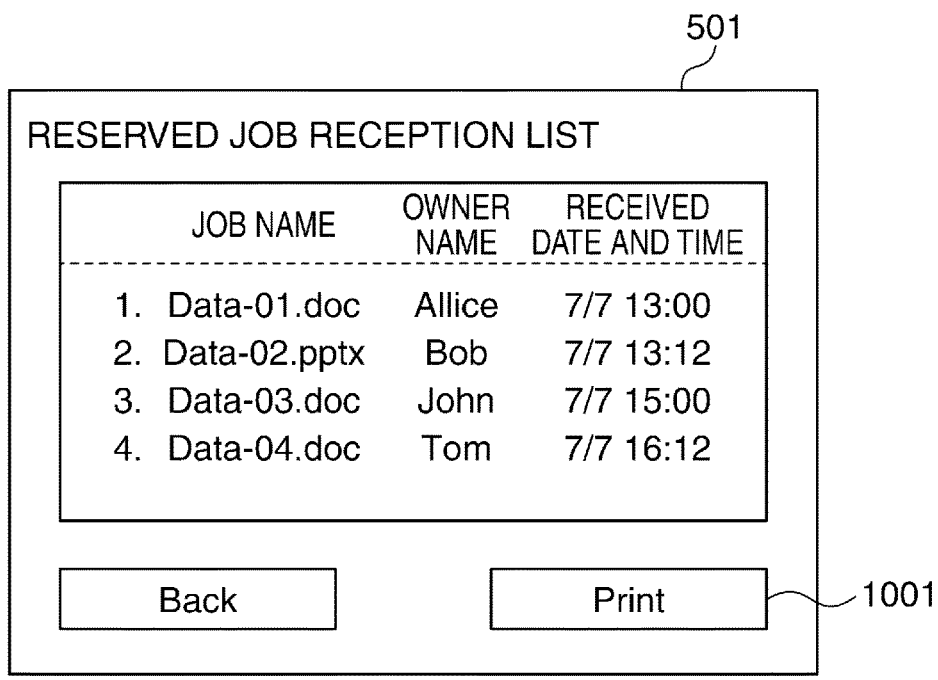
FIG. 6 is a diagram illustrating a screen of a reserved job reception list displayed on the console section of the printing apparatus in FIG. 2.

FIG. 6 is a diagram illustrating a screen of a reception list of reserved jobs (reserved job reception list) displayed on the console section 211 of the printing apparatus 100 shown in FIG. 2. Here, the reserved jobs refer to print jobs subjected to the reservation processing by the printing apparatus 100.

As shown, by way of example, in FIG. 6, the reserved job reception list 501 is composed of a job name, an owner name, and received date and time, of each reserved job. When the user searches the reserved job reception list 501 for a reserved job of which the owner name is the user's name, and instructs execution of printing based on print data of the reserved job (pushes a print button 1001), the reservation setting of the reserved job is cleared. After the clearance, print processing on sheets is performed based on the print data of the reserved job, and the printed sheets are discharged. Note that the configuration is not necessarily be such that the reserved job reception list displays reserved jobs of not only the user but also other owners than the user, on the screen of the console section 211, as in the case of the reserved job reception list 501 illustrated in FIG. 6. For example, the configuration may be such that in response to an operation by the user for displaying the reserved job reception list on the console section 211 of the printing apparatus 100, only reserved job(s) of the user is/are displayed on the list, on condition that user authentication processing is successfully executed.

Figure 7A:
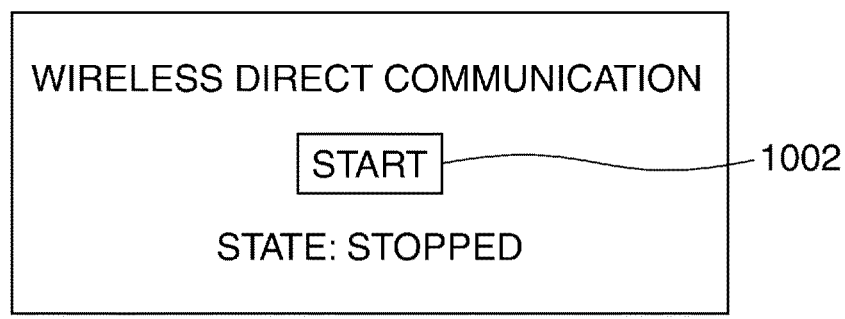
Figure 7B:
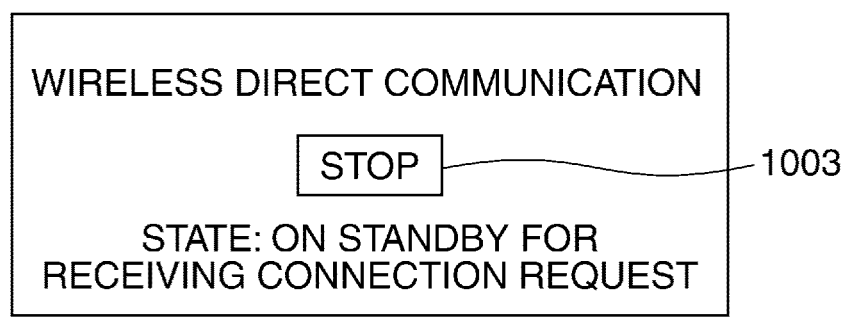
Figure 7C:
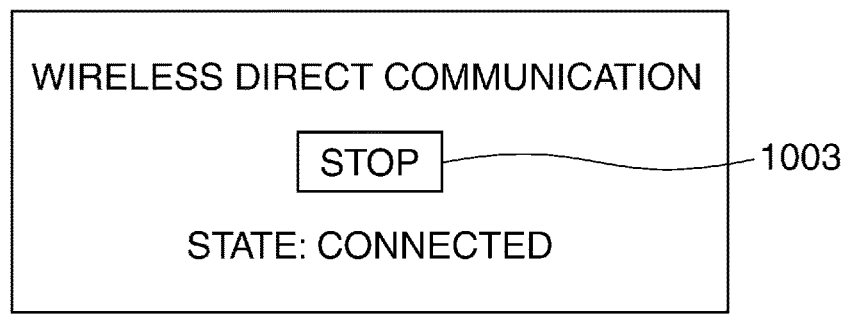

FIGS. 7A to 7C are diagrams illustrating screens displayed on the console section 211 of the printing apparatus 100 shown in FIG. 2, for starting and stopping wireless direct communication, in which FIG. 7A illustrates a screen for starting wireless direct communication, and FIGS. 7B and 7C illustrate screens for stopping wireless direct communication.

Wireless direct communication is in a stopped state by default, and the CPU 201 waits for the start of wireless direct communication until the user causes the screen shown, by way of example, in FIG. 7A to be displayed on the console section 211, and presses a start button 1002 on the screen. When the user presses the start button 1002 on the screen in FIG. 7A, the CPU 201 starts wireless direct communication. This causes wireless direct communication to be on standby for receiving a connection request from the mobile terminal 120, and the screen displayed on the console section 211 is switched to the screen shown, by way of example, in FIG. 7B. Thereafter, upon completion of connection between the mobile terminal 120 and the printing apparatus 100 by wireless direct communication, wireless direct communication enters a connected state, and the screen displayed on the console section 211 is switched to the screen shown, by way of example, in FIG. 7C. If the user presses a stop button 1003 when the screen in FIG. 7B or the screen in FIG. 7C is being displayed, or if disconnection processing is received from the mobile terminal 120, wireless direct communication enters the stopped state again. In this case, the screen displayed on the console section 211 is switched to the screen shown in FIG. 7A.

Figure 8:
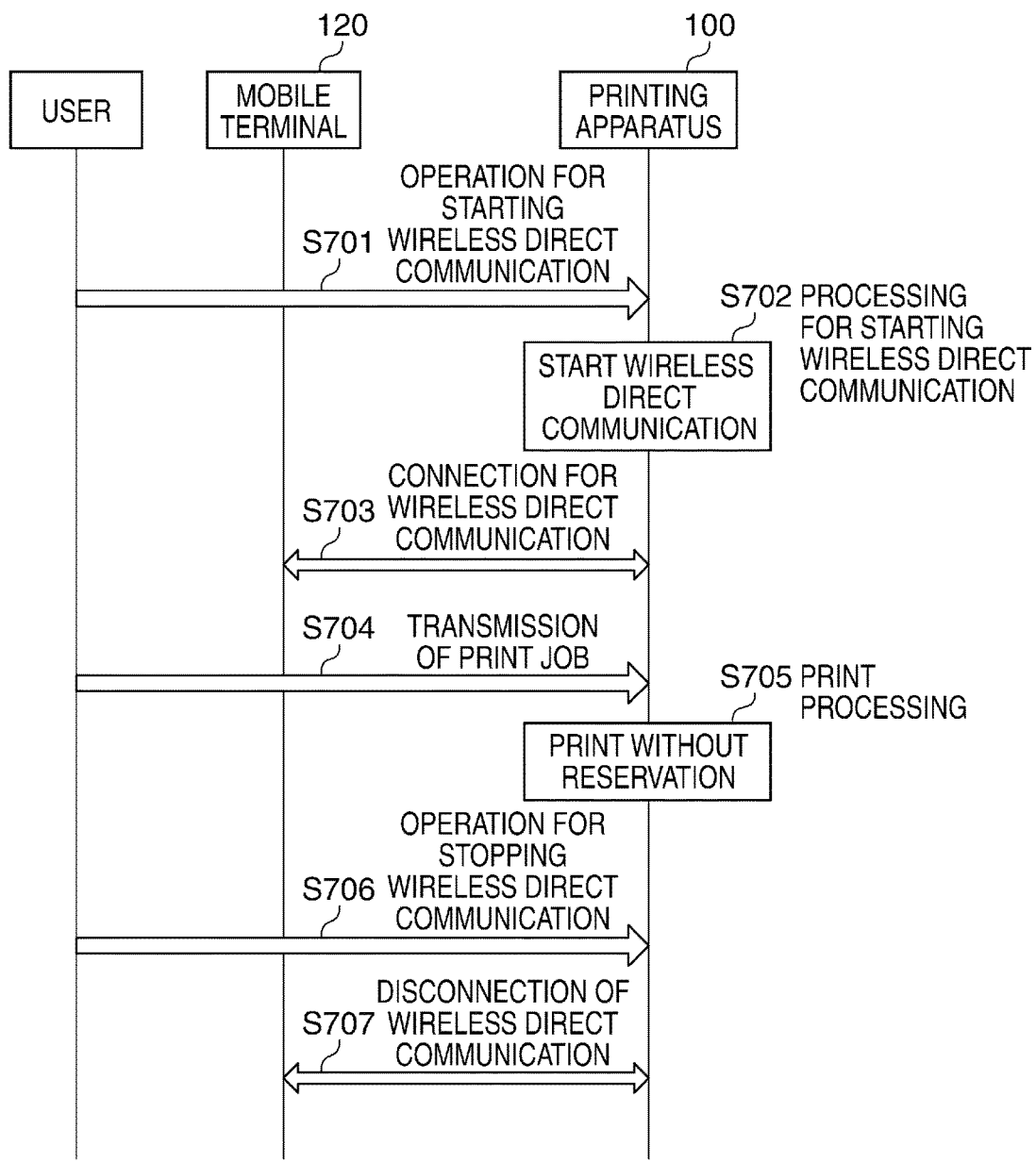
FIG. 8 is a sequence diagram showing a case where forced through printing is performed in the network system shown in FIG. 1 during wireless direct communication.

FIG. 8 is a sequence diagram showing a case where forced through printing is performed in the network system 1 shown in FIG. 1 during wireless direct communication. Note that the term "forced through printing" refers to the processing performed in the step S305 in FIG. 3.

First, when the user causes the FIG. 7A screen to be displayed on the console section 211 in the default state (stopped state) of wireless direct communication, and presses the start button 1002 on the screen, the CPU 201 detects the operation for starting wireless direct communication (step S701). Next, in a step S702, the CPU 201 performs a wireless direct communication starting process. At this time, the FIG. 7B screen is displayed on the console section 211.

Then, when the connection of wireless direct communication between the printing apparatus 100 and the mobile terminal 120 is completed in a step S703, the screen illustrated in FIG. 7C is displayed on the console section 211.

Following the display of the FIG. 7C screen on the console section 211, when the printing apparatus 100 receives a print job which the user has transmitted from the mobile terminal 120 via wireless direct communication, the CPU 201 detects transmission of the print job (step S704).

In response to the detection, the CPU 201 causes the printer 207 to perform the printing-and-discharging processing on the transmitted print job instead of performing the reservation processing (step S705). After termination of the printing-and-discharging processing, when the user presses the stop button 1003 on the FIG. 7C screen displayed on the console section 211, the CPU 201 detects the operation for stopping wireless direct communication (step S706). In response to the detection, the CPU 201 disconnects wireless direct communication between the printing apparatus 100 and the mobile terminal 120 (step S707).

As described above, in the printing apparatus 100, when it is detected that a print job has been transmitted via wireless direct communication by a user operation of the mobile terminal 120, the CPU 201 causes the printer 207 to perform the printing-and-discharging processing on the print job instead of performing the reservation processing. As a consequence, in the case where it is assured that the user is in front of the printing apparatus 100, no wasteful reservation processing is performed, whereby it is possible to realize reduction of operation load on the user and improvement of user-friendliness.

Next, a second embodiment of the present invention will be described. The present embodiment is different from the first embodiment in that the printing apparatus 100 is provided with a switch for selecting whether a print job received via wireless direct communication is to be reserved or to be subjected to forced through printing. Hereinafter, an example of a screen displayed on the console section 211, for serving as the switch, will be described with reference to FIG. 9, and control using the screen will be described with reference to FIG. 10.

Figure 9:
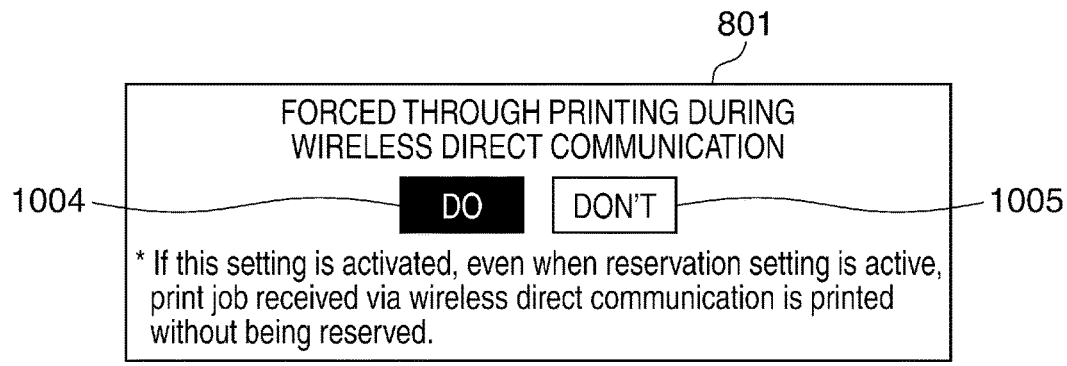
FIG. 9 is a diagram illustrating a screen displayed on the console section for setting forced through printing in a printing apparatus according to a second embodiment of the present invention.

FIG. 9 is a diagram illustrating a screen 801 displayed on the console section 211 for setting forced through printing in the printing apparatus according to the second embodiment.

In the present embodiment, even in a case where the reservation setting in the printing apparatus 100 is active, when a print job is received via wireless direct communication, it is additionally set whether the print job is to be reserved or to be subjected to forced through printing. More specifically, in a case where a "do" button 1004 is pressed in advance on the FIG. 9 screen to thereby activate forced through printing, the print job received via wireless direct communication is subjected to forced through printing without being reserved even when the reservation setting is active.

Figure 10:
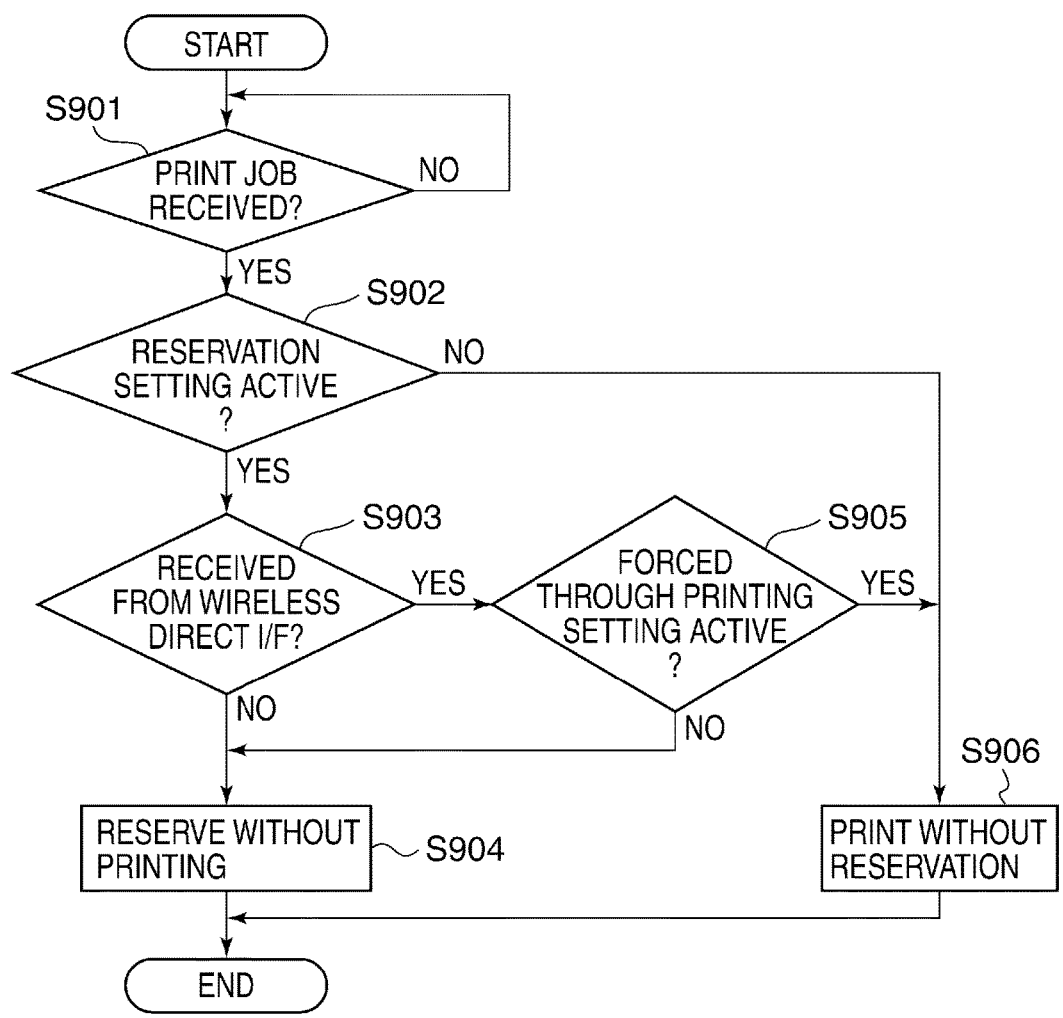
FIG. 10 is a flowchart of a process performed by the printing apparatus according to the second embodiment, for handling a print job received from outside.

FIG. 10 is a flowchart of a process performed by the printing apparatus according to the second embodiment, for handling a print job received from outside. Each step in the process shown in FIG. 10 is performed by the CPU 201 loading a control program stored in a memory, such as the ROM 203, into the RAM 202 and executing the program.

Steps S901 to S904 are the same as the steps S301 to S304 in FIG. 3 in the first embodiment. If the answer to the question of a step S903 (corresponding to the step S303 in FIG. 3) is affirmative (YES), the CPU 201 proceeds to a step S905, wherein the CPU 201 refers to a setting made on the FIG. 9 screen, and determines whether or not the setting of forced through printing is active. In a case where the "do" button 1004 has been pressed in advance on the FIG. 9 screen to thereby activate forced through printing, the CPU 201 determines that the setting of forced through printing is active (YES to the step S905), and proceeds to a step S906. The CPU 201 causes the printer 207 to perform the printing-and-discharging processing instead of performing the reservation processing (step S906), followed by terminating the present process.

On the other hand, in a case where a "don't" button 1005 is pressed in advance on the FIG. 9 screen to deactivate forced through printing, the CPU 201 determines that the setting of forced through printing is not active (NO to the step S905), and proceeds to the step S904, wherein the CPU 201 performs the reservation processing according to the reservation setting activated in the printing apparatus 100, followed by terminating the present process.

Figure 11:
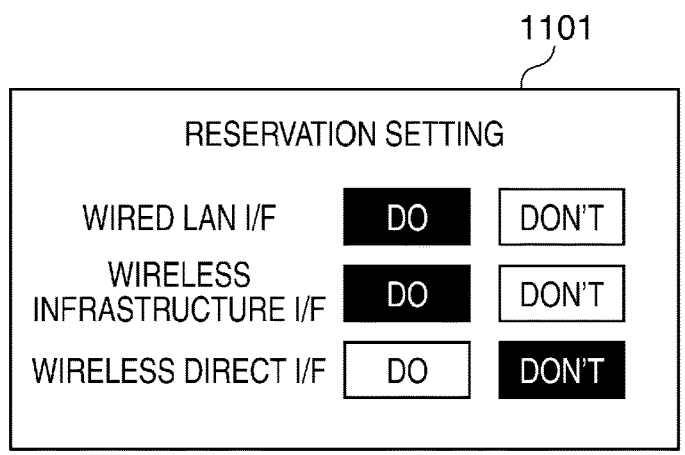
FIG. 11 is a diagram illustrating a screen displayed on the console section when reservation settings are made on an interface-by-interface basis in the printing apparatus according to the second embodiment.

Further, instead of the screen illustrated in FIG. 9, a screen 1101 for configuring reservation settings in association with respective network interfaces may be displayed, as shown in FIG. 11, for allowing the user to configure the settings. When each network interface receives a print job, the CPU 201 performs an operation for handing the pint job received by the printing apparatus 100 according to the reservation settings configured on the FIG. 11 screen on a network interface-by-network interface basis.

As described above, in preparation for a case where a print job is received by the wireless direct interface 212, the user can set in advance whether or not to reserve the received print job. This makes it possible to realize an operation desired by the user.

Next, a third embodiment of the present invention will be described. In the present embodiment, control performed when the mobile terminal 120 sends an instruction to the printing apparatus 100, as to whether or not to reserve a print job transmitted thereto, will be described with reference to FIG. 13 showing an example of packet data including the instruction, and FIG. 12 showing a process therefor.

FIG. 13 is a diagram illustrating the packet data, denoted by reference numeral 1201, of the print job which the mobile terminal 120 inputs to a printing apparatus according to the third embodiment. Although the packet data 1201 shown in FIG. 13 is basically the same as the packet data 401 (FIG. 5) according to the first embodiment, it is different from the packet data 401 in that job specific data (setting information) indicative of an attribute of "forced through print is desired or not" is embedded as a job attribute. Note that the mobile terminal 120 may have the job specific data embedded in the packet data in advance. Alternatively, the mobile terminal 120 may cause the job specific data to be embedded in the packet data when it is determined that the print job is to be input via wireless direct communication.

Figure 12:
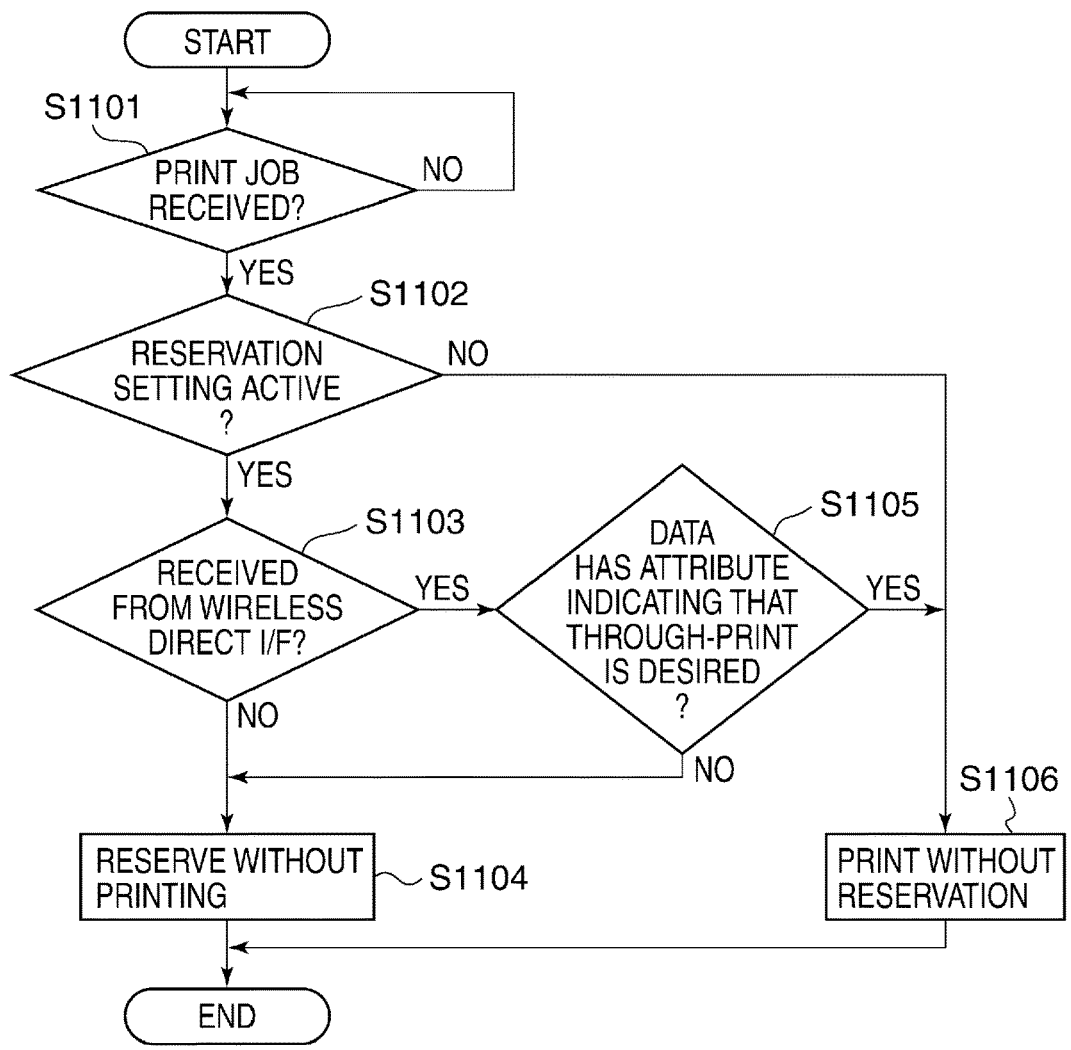
FIG. 12 is a flowchart of a process performed by the printing apparatus according to the third embodiment, for handling a print job received from outside.

FIG. 12 is a flowchart of the process performed by the printing apparatus according to the third embodiment, for handling a print job received from outside. Each step in the process shown in FIG. 12 is performed by the CPU 201 loading a control program stored in a memory, such as the ROM 203, into the RAM 202 and executing the program.

Steps S1101 to S1104 are the same as the steps S301 to S304 in FIG. 3 in the first embodiment. If the answer to the question of a step S1103 (corresponding to the step S303 in FIG. 3) is affirmative (YES), the CPU 201 determines in a step S1105 whether or not the setting of forced through printing is active, based on whether or not the value of the job specific data shown in FIG. 13 is "Through Print" which indicates "forced through printing is desired". If the job specific data has the value "Through Print", the CPU 201 determines that the setting of forced through printing is active (YES to the step S1105), and proceeds to a step S1106. In this case, the CPU 201 causes the printer 207 to perform the printing-and-discharging processing instead of performing the reservation processing (step S1106), followed by terminating the present process.

On the other hand, if the job specific data does not have the value "Through Print", the CPU 201 determines that the setting of forced through printing is not active (NO to the step S1105), and proceeds to the step S1104. In this case, the CPU 201 performs the reservation processing according to the reservation setting activated in the printing apparatus 100 (step S1104), followed by terminating the present process.

As described above, packet data including a print job input from the mobile terminal 120 stores an instruction as to whether or not to reserve the print job. Therefore, it is possible to realize an operation desired by the user without extra operation screens and control processing for determining whether or not to reserve the print job by the printing apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-218407 filed Nov. 6, 2015 which is hereby incorporated by reference herein in its entirety.

What is claimed is:

1. A printing apparatus including a wireless direct communication function and a reservation function for reserving a print job received from an external apparatus without executing the received print job until receiving a print instruction from a user, comprising:
   a user interface configured to set whether or not to use the reservation function;
   a communication interface configured to receive packet data corresponding to the print job received from the external apparatus;
   a determination unit configured to determine, based on an IP address of the external apparatus included in the received packet data corresponding to the print job received from the external apparatus, whether or not the print job received by the printing apparatus from the external apparatus is a print job received by the wireless direct communication function; and a control unit configured to execute the print job received by the printing apparatus without reserving, by the reservation function, the print job received by the printing apparatus according to said determination unit determining based on the IP address of the external apparatus included in the received packet data corresponding to the print job received from the external apparatus that the print job received by the printing apparatus is a print job received by the wireless direct communication function, even in a case where use of the reservation function has been set by said user interface, wherein the determination unit and the control unit are implemented by at least one processor.

2. The printing apparatus according to claim 1, wherein in a case where the use of the reservation function has been set by said user interface, and also it is determined by said determination unit that the print job received by the printing apparatus is not a print job received by the wireless direct communication function, the print job received by the printing apparatus is reserved in a storage unit, and wherein said control unit executes the reserved print job according to an input of a print instruction from a user to the printing apparatus, for executing the print job reserved in the storage unit.

3. The printing apparatus according to claim 1, wherein in a case where the use of the reservation function has not been set by said user interface, said control unit executes the print job received by the printing apparatus without reserving the print job received by the printing apparatus by the reservation function.

4. The printing apparatus according to claim 1, further comprising a display configured to display a setting screen for the user to select whether or not to use the reservation function, and wherein said user interface sets whether or not to use the reservation function according to selection of the user on the setting screen.

5. The printing apparatus according to claim 1, wherein in a case where the IP address of the external apparatus matches an IP address assigned by the printing apparatus serving as a DHCP server, said determination unit determines that the print job received by the printing apparatus is a print job received by the wireless direct communication function.

6. The printing apparatus according to claim 1, wherein the wireless direct communication function is a function of Wi-Fi direct communication.

7. A printing apparatus including a wireless direct communication function and a reservation function for reserving a print job received from an external apparatus without executing the received print job until receiving a print instruction from a user, comprising:

a communication interface configured to receive packet data corresponding to the print job received from the external apparatus;

a first determination unit configured to, when the printing apparatus receives a print job from the external apparatus, determine, based on an IP address of the external apparatus included in the received packet data corresponding to the print job received from the external apparatus, whether or not to reserve, by the reservation function, the print job received by the printing apparatus; and a control unit configured to reserve the print job received by the printing apparatus in a storage unit according to said first determination unit determining based on the IP address of the external apparatus included in the received packet data corresponding to the print job received from the external apparatus that the print job received by the printing apparatus is to be reserved, and execute the print job received by the printing apparatus without reserving, by the reservation function, the print job received by the printing apparatus according to said first determination unit determining based on the IP address of the external apparatus included in the received packet data corresponding to the print job received from the external apparatus that the print job received by the printing apparatus is not to be reserved, wherein in a case where the print job received by the printing apparatus is a print job received by the wireless direct communication function, and also a setting indicating that no print job received by the wireless direct communication function is to be reserved has been made in the printing apparatus, said first determination unit determines that the print job received by the printing apparatus is not to be reserved, and wherein the first determination unit and the control unit are implemented by at least one processor.

8. The printing apparatus according to claim 7, wherein in a case where the print job received by the printing apparatus is a print job received by the wireless direct communication function, and also a setting indicating that a print job received by the wireless direct communication function is to be reserved has been made in the printing apparatus, said first determination unit determines that the print job received by the printing apparatus is to be reserved.

9. The printing apparatus according to claim 7, wherein in a case where the print job received by the printing apparatus is a print job received by a communication function different from the wireless direct communication function, said first determination unit determines that the print job received by the printing apparatus is to be reserved.

10. The printing apparatus according to claim 9, wherein the communication function different from wireless direct communication function is a wired LAN function or a wireless infrastructure function.

11. The printing apparatus according to claim 7, wherein said control unit executes the reserved print job according to an input of a print instruction from a user to the printing apparatus, for executing the print job reserved in the storage unit.

12. The printing apparatus according to claim 7, further comprising a second determination unit configured to determine whether or not the print job received by the printing apparatus is a print job received by the wireless direct communication function, wherein the second determination unit is implemented by at least one processor.

13. The printing apparatus according to claim 12, wherein in a case where the IP address of the external apparatus matches an IP address assigned by the printing apparatus serving as a DHCP server, said second determination unit determines that the print job received by the printing apparatus is a print job received by the wireless direct communication function.

14. The printing apparatus according to claim 7, wherein the wireless direct communication function is a function of Wi-Fi direct communication.

15. A method of controlling a printing apparatus including a wireless direct communication function and a reservation function for reserving a print job received from an external apparatus without executing the received print job until receiving a print instruction from a user, comprising:
 setting whether or not to use the reservation function;
 receiving packet data corresponding to the print job received from the external apparatus;
 determining, based on an IP address of the external apparatus included in the received packet data corresponding to the print job received from the external apparatus, whether or not the print job received by the printing apparatus from the external apparatus is a print job received by the wireless direct communication function; and
 executing the print job received by the printing apparatus without reserving, by the reservation function, the print job received by the printing apparatus according to a determination based on the IP address of the external apparatus included in the received packet data corresponding to the print job received from the external apparatus that the print job received by the printing apparatus is a print job received by the wireless direct communication function, even in a case where use of the reservation function has been set.

16. A method of controlling a printing apparatus including a wireless direct communication function and a reservation function for reserving a print job received from an external apparatus without executing the received print job until receiving a print instruction from a user, comprising:
 receiving packet data corresponding to the print job received from the external apparatus;
 when the printing apparatus receives a print job from the external apparatus, determining, based on an IP address of the external apparatus included in the received packet data corresponding to the print job received from the external apparatus, whether or not to reserve, by the reservation function, the print job received by the printing apparatus; and
 reserving the print job received by the printing apparatus in a storage unit according to a determination based on the IP address of the external apparatus included in the received packet data corresponding to the print job received from the external apparatus that the print job received by the printing apparatus is to be reserved, and executing the print job received by the printing apparatus without reserving, by the reservation function, the print job received by the printing apparatus according to a determination based on the IP address of the external apparatus included in the received packet data corresponding to the print job received from the external apparatus that the print job received by the printing apparatus is not to be reserved,
 wherein in a case where the print job received by the printing apparatus is a print job received by the wireless direct communication function, and also a setting indicating that no print job received by the wireless direct communication function is to be reserved has been made in the printing apparatus, it is determined that the print job received by the printing apparatus is not to be reserved.

* * * * *